United States Patent [19]
Baxter

[11] 3,848,786
[45] Nov. 19, 1974

[54] PIPE SUPPORTING RACK FOR VEHICLE

[76] Inventor: James S. Baxter, 214 Lake Shore Dr., Oxford, Mich. 48051

[22] Filed: Dec. 4, 1972

[21] Appl. No.: 312,026

[52] U.S. Cl............ 224/42.45 R, 211/60 R, 248/73
[51] Int. Cl............................................. B60r 11/00
[58] Field of Search............ 224/42.45 R; 211/60 R; 248/224, 73

[56] References Cited
UNITED STATES PATENTS
| | | | |
|---|---|---|---|
| 2,672,265 | 3/1954 | Milstead...................... | 224/42.45 R |
| 3,164,255 | 1/1965 | Jay................................ | 211/60 R |
| 3,580,441 | 5/1971 | Zercher...................... | 224/42.45 R X |

Primary Examiner—Robert J. Spar
Assistant Examiner—Jerold M. Forsberg
Attorney, Agent, or Firm—Charles W. Chandler

[57] ABSTRACT

A set of racks are mounted on a vehicle for carrying pipe and similar elongated objects. A support on each rack has a U-shaped configuration for receiving the pipe, and carries a carriage bolt with a head received in a keyhole shaped opening in a bracket attached to the vehicle to allow the support to be easily removed from the vehicle when not being used.

1 Claim, 4 Drawing Figures

PATENTED NOV 19 1974 3,848,786
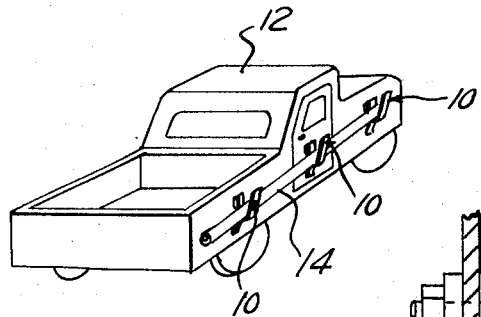
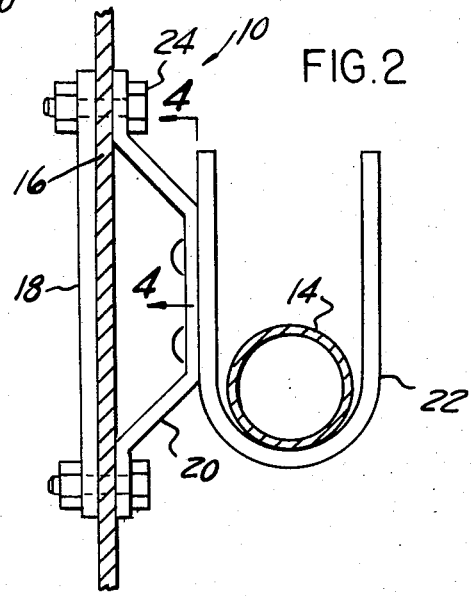
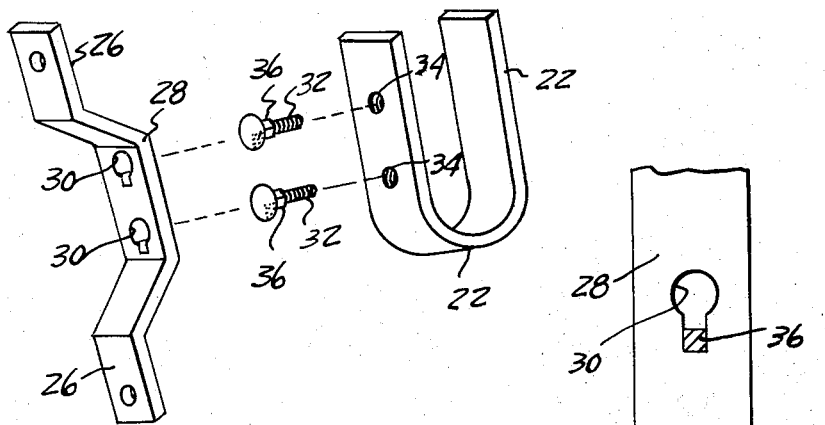

PIPE SUPPORTING RACK FOR VEHICLE

BACKGROUND OF THE INVENTION

This invention relates to racks removably mounted on vehicles for carrying elongated objects such as pipe and the like.

Fabricated racks are often attached to pick-up trucks for carrying elongated materials such as soil pipe, steel bar stock, and the like. Such racks have been disclosed in the prior art for use by plumbers and others. Examples of such art are shown in U.S. Pat. No. 2,672,265 issued to W. C. Milstead, and Pat. No. 2,680,544, issued to B. H. Hunt, Sr., et al. Such prior art racks are usually difficult to attach to the vehicle, and bulky to store when not in use.

SUMMARY OF THE INVENTION

The broad purpose of the present invention is to provide a rack that can be easily assembled on a vehicle for carrying pipe without requiring the manipulation of special fasteners. Another object of the invention is to provide a removable U-shaped support for carrying pipe that can be stored in a relatively compact area.

The preferred embodiment of the invention, which will be described in greater detail, comprises three sets of brackets attached to the side of a pick-up truck. Each bracket has a pair of keyhole shaped openings. A U-shaped support has a pair of square necked carriage bolts removably seated in the keyhole shaped openings. Carriage bolts are employed because the head of such a fastener provides a large seating surface so that the supports can cooperate to hold a relatively long item such as a twenty foot section of copper pipe, or a ten foot section of soil pipe. When the supports are removed from their respective brackets, they can be easily stored in a relatively compact area. The brackets can also be attached on other vehicles such as an automobile or the like to carry objects not readily carried in the vehicle.

Still further objects and advantages of the invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views and in which:

FIG. 1 is a perspective view showing the preferred racks mounted on a pick-up truck;

FIG. 2 is a sectional view showing the manner in which a typical rack is mounted on a vehicle;

FIG. 3 is an exploded view of the typical rack; and

FIG. 4 is a view as seen along lines 4—4 of FIG. 2.

DESCRIPTION OF THE PREFERRED EMBODIMENT

FIG. 1 illustrates three sets of preferred racks 10 mounted on a vehicle 12 for carrying soil pipe 14. The forward and rearward racks are mounted adjacent the forward and rearward fenders, respectively, of vehicle 12, while the middle rack is mounted on the vehicle door. The relative positions of the racks on other vehicles would depend upon the nature of the material that is being carried as well as the type of vehicle.

The middle rack 10 is illustrated in FIG. 2 to show the manner in which it is mounted which is typical of the other two brackets except as noted. The rack is mounted on a sheet metal door panel 16. A backing plate 18 is mounted behind panel 16 to reinforce it. Plate 18 is unnecessary for the other two racks.

Each rack 10 includes a bracket 20 and a support 22. Bracket 20 is formed of an elongated metal strap having ends 26 attached to door panel 16 by fasteners 24. Bracket 20 has a substantially U-shaped midsection 28 with a pair of keyhole shaped openings 30. Support 22 is preferably U-shaped with a top opening for receiving one or more sections of pipe 14. A pair of carriage bolts 32 are mounted in openings 34 tapped in support 22. Each bolt 34 has a conventional square neck 36 with a diameter accommodating the narrow lower end of opening 30, as illustrated in FIG. 4. The head of each carriage bolt 34 is slightly smaller than the large end of opening 30 so as to be received through the opening and then lowered until the square neck fits in the bottom of opening 30. Carriage bolts 34 are preferred because their round heads 38 provides a relatively large surface area for engaging bracket midsection 28.

Bolts 32 permit the user to easily mount each support in position in its respective bracket when pipe 14 is to be transported, and to be removed from their respective supports at other times.

Having described my invention, I claim:

1. Means for transporting an elongated object having a circular cross setion, comprising:

a vehicle;

a plurality of brackets each having upper and lower portions rigidly attached to the vehicle at a common vertical height, and horizontally spaced to accomodate the length of the elongated object, each bracket having a horizontally off-set mid-section with a pair of vertically spaced key-hole shaped openings in which the large end of each opening is above the narrow end thereof;

a U-shaped support for each bracket, each support having a pair of spaced sides forming a top opening for receiving the elongated object, and a semi-circular bight having a diameter greater than that of the circular cross-section of the elongated object; and a pair of members carried on one side of each support and received in respective key-hole shaped openings, each member having a head and a neck, the head being larger than that of the narrow end of the key-hole shaped opening but smaller than the large end thereof, the head being spaced a distance from the support accomodating the thickness of the bracket, and the neck having a diameter suited for being received in the small end of the key-hole shaped opening, whereby the supports are aligned to cooperate in removably receiving an elongated object such as a section of pipe.

* * * * *